W. P. FOUTS & F. B. HOBBS.
EXPANSION REAMER.
APPLICATION FILED MAY 15, 1909.
961,115.
Patented June 14, 1910.
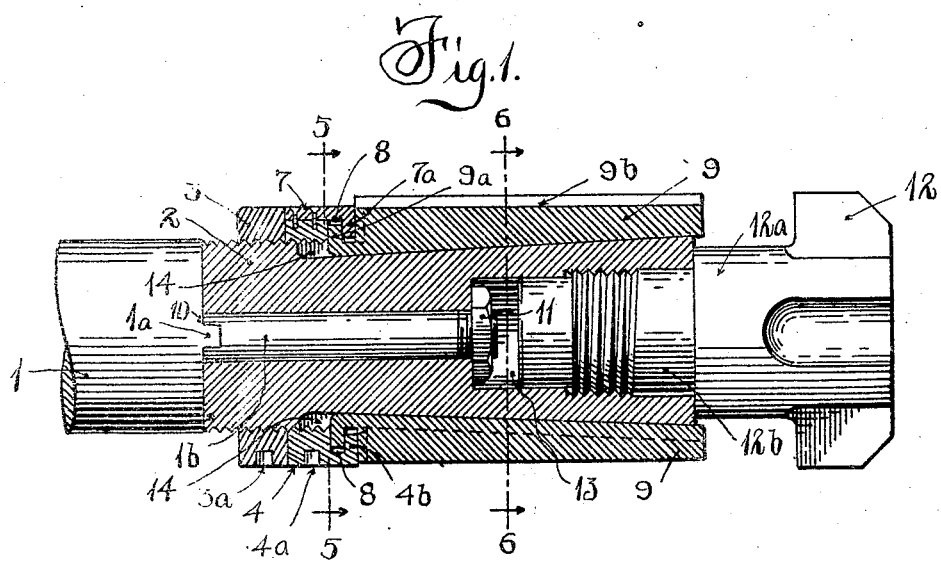
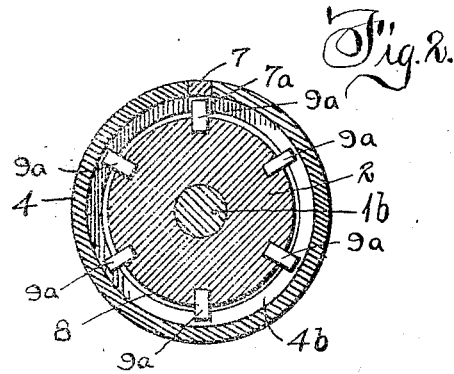
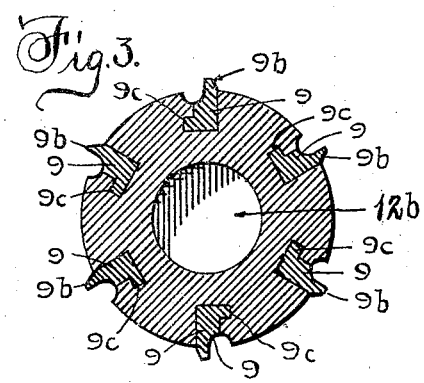
Witnesses:
Monroe E. Miller
John A. Bommhardt
Inventors:
William P. Fouts and
Frank B. Hobbs
By Geo. E. Tew
Attorney.

UNITED STATES PATENT OFFICE.

WILLIAM P. FOUTS AND FRANK B. HOBBS, OF CLEVELAND, OHIO.

EXPANSION-REAMER.

961,115.

Specification of Letters Patent. Patented June 14, 1910.

Application filed May 15, 1909. Serial No. 496,191.

*To all whom it may concern:*

Be it known that we, WILLIAM P. FOUTS and FRANK B. HOBBS, citizens of the United States, residing at Cleveland, in the county of Cuyahoga and State of Ohio, have invented certain new and useful Improvements in Expansion-Reamers, of which the following is a specification.

This invention relates to that type of expansion reamers having a central cone and adjustable blades thereon, and has for its object to provide improved means for moving the blades and for holding the same in place and for giving a fine adjustment thereto.

The particular construction and advantages of the reamer will be more fully apparent from the following description and the accompanying drawings in which—

Figure 1 is a central longitudinal section of the reamer. Figs. 2 and 3 are cross sections on the lines 5—5 and 6—6 of Fig. 1, respectively.

Referring specifically to the drawings, 2 indicates the central conical body or stock of the reamer, and it abuts against the end of and is rigidly secured to the shaft 1 of the holder by means of a stud bolt 1$^b$ projecting from the shank and extending through a central bore in the body and provided at the front end with a nut 11 which is located in a recess 13 in the front end of said body. The rear end of the body is notched as at 10 to receive a cross rib 1$^a$ at the end of the shank, to prevent relative movement of the parts.

The front end of the conical body 2 is interiorly threaded to receive the threaded shank 12$^b$ of a drill 12, which is spaced from the reamer by an enlarged neck 12$^a$.

The cutters 9 extend lengthwise of the core 2, and have cutting edges 9$^b$ and inner ribs 9$^c$, and are slidably mounted in grooves 14 produced in the surface of the core 2. Said grooves are inclined or diverge toward the front end of the tool. The ribs 9$^c$ of the cutters hold the same in the grooves, and the inner edge of the cutters, as well as the ribs 9$^c$, are inclined to the same extent or degree as the grooves 14.

The rear end of the core 2 is threaded to receive an adjusting nut 4 and a jam nut 3, respectively having recesses 4$^a$ and 3$^a$ to receive a spanner wrench. The nut 4 has an inner annular groove 8 near the front end thereof, forming an inwardly projecting flange 4$^b$. Said nut is also recessed at one side to receive a detachable piece 7 having an inwardly extending projection 7$^a$ at its front end which matches with and completes the flange 4$^b$.

At the inner end of each cutter is an outwardly projecting finger or part 9$^a$, which when the cutters are in place fits within or behind the flange 4$^b$, or in the groove 8. It is obvious that by turning the nut the cutters are advanced or retracted along the central core or body, and are thus expanded or contracted.

The fingers 9$^a$ are engaged or inserted in the groove 8 by removing the piece 7, thus making an opening in the flange 4$^b$, and permitting the cutters to be pushed back through the opening and behind the flange, successively as the nut is turned. When they are all inserted and engaged the piece 7 is replaced and fastened in position by its screws.

In use, if the drill 12 is used, it should be spaced far enough from the reamer to leave the work before the reamer enters. Obviously the reamer can be used without the drill if desired. To expand the cutters, the jam nut 3 is loosened and the nut 4 is turned outwardly, thus advancing the cutters along the cone and expanding the same. Opposite movement of the nut contracts the cutters. Inasmuch as the degree of inclination of the grooves 14 is small the amount of expansion or contraction is very little in comparison with the turning movement of the nut 4, and consequently a very fine adjustment may be made. When the cutters are set as desired the jam nut is tightened to a holder.

We claim:—

1. A reamer comprising a tapered grooved stock, cutters slidable in the grooves and having outwardly-extending fingers at their rear ends, and a ring-nut screwed on said stock and having an internal annular groove receiving said fingers and also having an external recess, and a detachable piece fitting said recess and having an inwardly extending projection at its front end, substantially as described.

2. A combined reamer and drill comprising a stock with an axial bore extending through the same, and counterbored and threaded at the front end, a drill the shank of which is threaded and screwed into said counterbore and the head of which abuts the front end of the stock, means within said bore to fasten the stock to a shank at the rear end thereof, and cutters on the periphery of said stock.

In testimony whereof, we do affix our signatures in presence of two witnesses.

WILLIAM P. FOUTS.
FRANK B. HOBBS.

Witnesses:
JOHN A. BOMMHARDT,
MONROE E. MILLER.